US012681550B2

(12) United States Patent
Yu et al.

(10) Patent No.: US 12,681,550 B2
(45) Date of Patent: Jul. 14, 2026

(54) POWER ARBITRATION FOR SYSTEMS OF ELECTRONIC COMPONENTS

(71) Applicant: Micron Technology, Inc., Boise, ID (US)

(72) Inventors: Liang Yu, Boise, ID (US); Jonathan S. Parry, Boise, ID (US); Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 168 days.

(21) Appl. No.: 18/443,955

(22) Filed: Feb. 16, 2024

(65) Prior Publication Data

US 2024/0288924 A1 Aug. 29, 2024

Related U.S. Application Data

(60) Provisional application No. 63/447,830, filed on Feb. 23, 2023.

(51) Int. Cl.
*G11C 16/04* (2006.01)
*G06F 1/3225* (2019.01)
*G06F 11/30* (2006.01)

(52) U.S. Cl.
CPC ........ *G06F 1/3225* (2013.01); *G06F 11/3062* (2013.01)

(58) Field of Classification Search
CPC ........................... G06F 1/3255; G06F 11/3062
See application file for complete search history.

(56) References Cited

U.S. PATENT DOCUMENTS

| | | | | | |
|---|---|---|---|---|---|
| 5,753,927 | A | * | 5/1998 | Schneider | H03K 17/0822 |
| | | | | | 250/214 SW |
| 9,320,116 | B2 | * | 4/2016 | Lydecker | G05F 1/66 |
| 2006/0271797 | A1 | * | 11/2006 | Ginggen | G06F 1/3203 |
| | | | | | 713/300 |
| 2022/0045500 | A1 | * | 2/2022 | Kendzia, III | H02H 3/325 |

* cited by examiner

*Primary Examiner* — Pho M Luu

(57) ABSTRACT

Methods, systems, and devices for power arbitration for systems of electronic components. A system may include a power source, a signaling conductor coupled with a voltage source, and a set of electronic components. One or more of the electronic components may include respective circuitry coupled with the power source and a respective switching component (e.g., a transistor) coupled with the signaling conductor. In some implementations, an electronic component of the set may be configured to determine an operation of its respective circuitry that is associated with a power consumption from the power source. Based on such a determination, the electronic component may switch its respective switching component in accordance with an identifier associated with the electronic component, and determine whether to perform the operation based on monitoring a signal level of the signaling conductor during the switching.

20 Claims, 4 Drawing Sheets

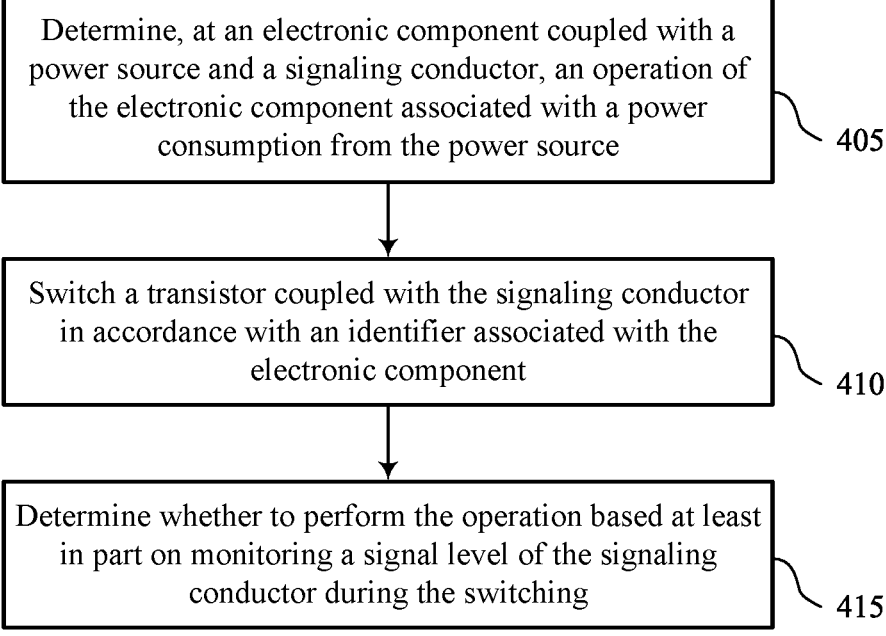

Determine, at an electronic component coupled with a power source and a signaling conductor, an operation of the electronic component associated with a power consumption from the power source

405

Switch a transistor coupled with the signaling conductor in accordance with an identifier associated with the electronic component

410

Determine whether to perform the operation based at least in part on monitoring a signal level of the signaling conductor during the switching

POWER ARBITRATION FOR SYSTEMS OF ELECTRONIC COMPONENTS

CROSS REFERENCE

The present application for Patent claims the benefit of U.S. Provisional Patent Application No. 63/447,830 by YU et al., entitled "POWER ARBITRATION FOR SYSTEMS OF ELECTRONIC COMPONENTS," filed Feb. 23, 2023, assigned to the assignee hereof, and expressly incorporated by reference herein.

TECHNICAL FIELD

The following relates to one or more systems for memory, including power arbitration for systems of electronic components.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIG. 4 illustrates a flowchart showing a method or methods that support power arbitration for systems of electronic components in accordance with examples as disclosed herein.

DETAILED DESCRIPTION

Figure 1:
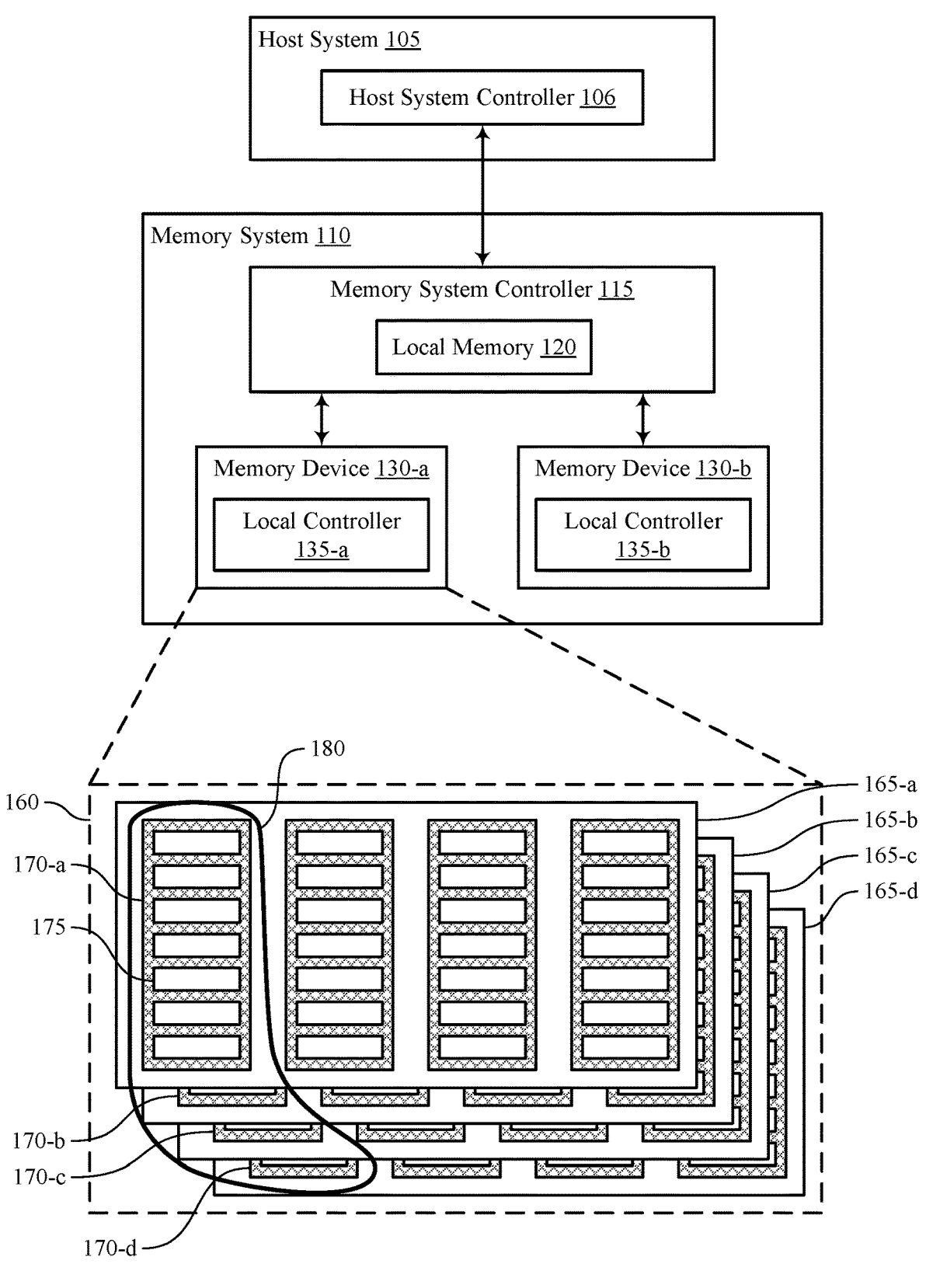
FIG. 1 illustrates an example of a system that supports power arbitration for systems of electronic components in accordance with examples as disclosed herein.

Some electronic systems may include multiple electronic components that are each coupled with a power source. For example, a memory system, such as a NAND system or a managed NAND (MNAND) system, may include one or more memory dies and, in some examples, an application-specific integrated circuit (ASIC), among other components that use power from the same power source to perform one or more operations. In some examples, each of a set of electronic components may perform internal asynchronous operations that are independent of other electronic components of the set. When sharing a common power source, to support managing peak power consumption from the power source, each electronic component may be configured to request (e.g., contend for, reserve) a power allocation from the power source to perform operations associated with the respective internal asynchronous operations. In some cases, however, if multiple electronic components concurrently request power on a shared bus, a bus conflict may occur. In some examples of bus conflicts (e.g., to avoid exceeding a peak power consumption threshold), the multiple electronic components requesting for data may cancel their respective requests and reissue a subsequent request for power. Reissuing subsequent requests in response to such conflicts may introduce latency for performing operations of the electronic components and decrease the performance of the system.

A system of electronic components may be configured to mitigate the effect of power request conflicts in accordance with techniques described herein. For example, each electronic component may be associated with a respective arbitration identifier, such as a set of one or more bits, that associates a given electronic component with a priority for power requests. If multiple electronic components request power concurrently using their respective identifiers, an electronic component with a highest-priority identifier may proceed with performing a power reservation, whereas one or more electronic components with a lower-priority identifier may refrain from performing a power reservation and from performing one or more power-consuming operations. For example, an electronic component with a highest-priority arbitration identifier may indicate a second identifier (e.g., a power token) that reserves power from the power source for use at the electronic component. In some examples, an electronic component that does not win arbitration may continue to attempt arbitration until the electronic component wins arbitration.

In some examples, an electronic system may be configured with a power allocation threshold (e.g., a power allocation limit, at least a portion of the power capacity of a power source or a peak power consumption threshold for the electronic system), and each electronic component of the electronic system may be configured to identify an amount of power remaining from the power allocation threshold (e.g., an available power, remaining after one or more requests for power). In some such examples, a given electronic component may perform arbitration if the available power is greater than or equal to the power allocation the would be requested by the electronic component. The use of arbitration identifiers at each electronic component of an electronic system may allow for each of the electronic components to contend for power allocation concurrently while alleviating drawbacks of request conflicts while managing peak power consumption. For example, when multiple electronic components request power concurrently, one of the electronic components may continue to indicate a power token to reserve power without interruption, which may increase the performance of the memory system.

Figure 2:
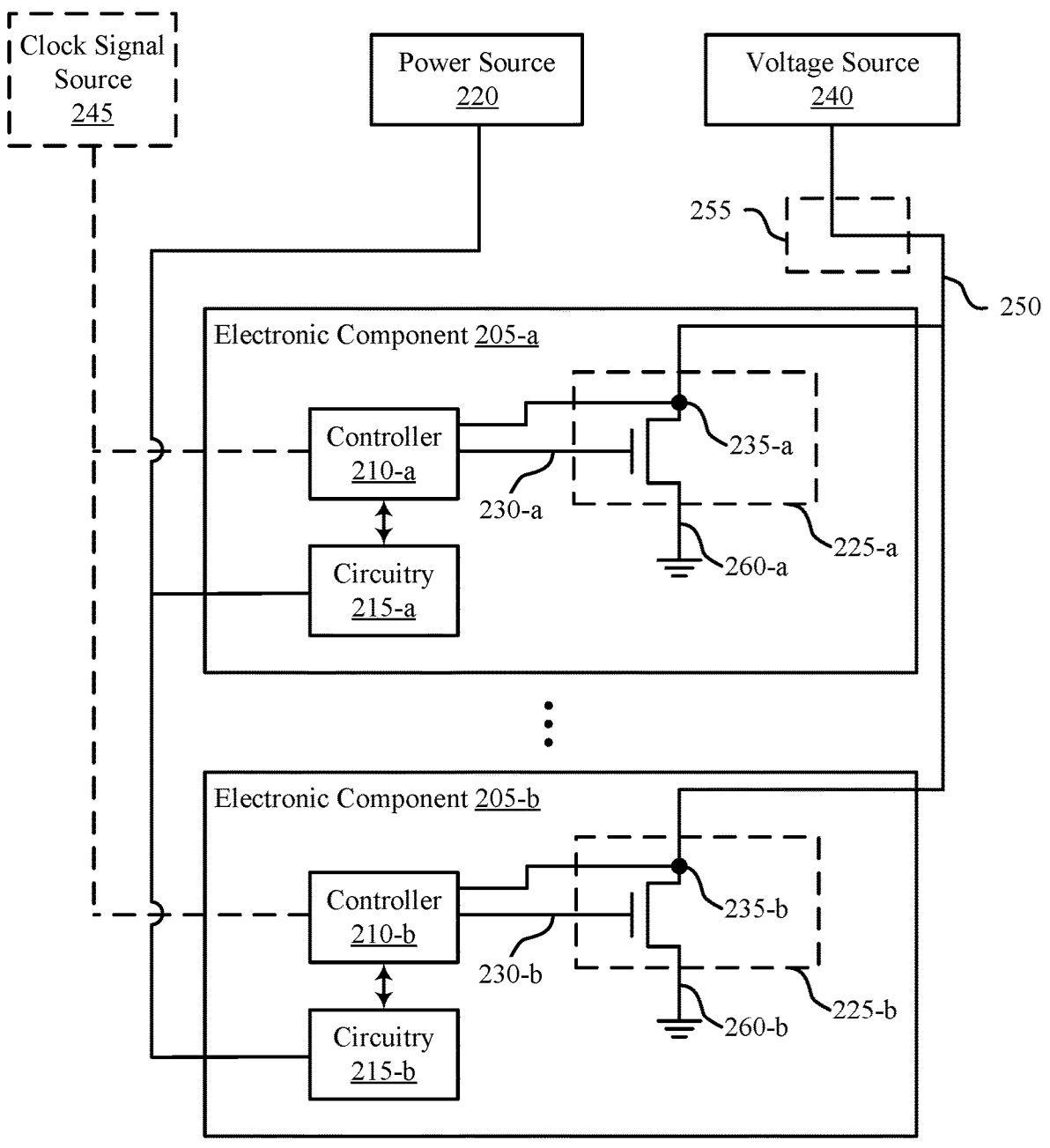
FIG. 2 illustrates an example of a system that supports power arbitration for systems of electronic components in accordance with examples as disclosed herein.

Features of the disclosure are initially described in the context of systems with reference to FIGS. 1 and 2. Features of the disclosure are described in the context of a signaling diagram with reference to FIG. 3. These and other features of the disclosure are further illustrated by and described in the context of a flowchart that relate to power arbitration for systems of electronic components with reference to FIG. 4.

FIG. 1 illustrates an example of a system 100 that supports power arbitration for systems of electronic components in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an ASIC, a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is an MNAND device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is an MNAND system.

The system 100 may be an example of a system of electronic components that are each coupled with a power source (not shown). For example, a host system 105, a host system controller 106, a memory system 110, a memory system controller 115, one or more memory devices 130, or one or more dies 160 may each be an example of an electronic component that is associated with a respective coupling with a shared power source to support performing various operations. In some examples, each of a set of electronic components may perform internal asynchronous operations that are independent of other electronic components of the set. Each such electronic component may be configured to request (e.g., contend for, reserve) a power allocation from the power source to perform operations associated with the respective internal asynchronous operations. In some implementations, however, if multiple electronic components concurrently request power on a shared bus, a bus conflict may occur. In some examples of bus conflicts, the multiple electronic components requesting for data may cancel their respective requests and reissue a subsequent request for power. Reissuing subsequent requests in response to such conflicts may introduce latency for performing operations of the electronic components and decrease the performance of the system.

Electronic components of the system 100 may be configured to mitigate the effect of power request conflicts in accordance with techniques described herein. For example, each electronic component may be associated with a respective arbitration identifier, such as a set of one or more bits, that associates a given electronic component with a priority for power requests. If multiple electronic components request power concurrently using their respective identifiers, an electronic component with a highest-priority identifier may proceed with performing a power reservation, whereas one or more electronic components with a lower-priority identifier may refrain from performing a power reservation and from performing one or more power-consuming operations. For example, an electronic component with a highest-priority arbitration identifier may indicate a second identifier (e.g., a power token) that reserves power from the power source for use at the electronic component. In some examples, an electronic component that does not win arbitration may continue to attempt arbitration until the electronic component wins arbitration.

In some examples, the system 100 may be configured with a power allocation threshold (e.g., a power allocation limit, at least a portion of the power capacity of a power source), and each electronic component of the system 100 may be configured to identify an amount of power remaining from the power allocation threshold (e.g., an available power, remaining after one or more requests for power). In some such examples, a given electronic component may perform arbitration if the available power is greater than or equal to the power allocation the would be requested by the electronic component. The use of arbitration identifiers at each electronic component of the system 100 may allow for each of the electronic components to contend for power allocation concurrently while alleviating drawbacks of request conflicts. For example, when multiple electronic components request power concurrently, one of the electronic components may continue to indicate a power token to reserve power without interruption, which may increase the performance of the system 100.

The system 100 may include any quantity of circuitry, logic, or non-transitory computer readable media that support power arbitration for systems of electronic components. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. Such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

FIG. 2 illustrates an example of a system 200 that supports power arbitration for systems of electronic components in accordance with examples as disclosed herein. The system 200 includes a set of electronic components 205 that each include respective circuitry 215 (e.g., electronic component 205-a including circuitry 215-a, electronic component 205-b including circuitry 215-b) that is coupled with a power source 220 (e.g., a shared power source). The power source 220 may be an example of a power supply with a finite capacity, such as a voltage regulator associated with a finite power capacity for providing a regulated voltage. Although FIG. 2 illustrates an example with two electronic components 205, a system 200 in accordance with the described techniques may include any quantity of electronic components 205 that are coupled with a power source 220.

In some examples, the system 200 may include one or more components described with reference to the system 100. For instance, one or more electronic components 205 may be an example of a host system 105, a host system controller 106, a memory system 110, a memory system controller 115, one or more memory devices 130, or one or more dies 160, among other electronic components that are included in a system 100 or another system of electronic components. In some implementations, a first electronic component 205 may be an ASIC or another example of processing circuitry (e.g., implementing aspects of a host system controller 106, or a memory system controller 115, or a combination thereof, such as MNAND processing circuitry or application processing circuitry), and one or more second electronic components 205 may be a NAND or MNAND memory die 160 or memory device 130, among other types of memory dies 160 or memory devices 130, which each may be operable in response to indications (e.g., commands, requests) from the first electronic component 205.

At least some operations of the circuitry 215 of one electronic component 205 may be independent from (e.g., asynchronous with) operations of circuitry 215 of another electronic component 205. Thus, each electronic component 205 may include a respective controller 210 (e.g., controller 210-a of the electronic component 205-a, controller 210-b of the electronic component 205-b) that supports functionality to mitigate the effect of conflicts related to requesting or reserving an allocation of power from the power source 220 (e.g., to avoid exceeding a peak power capacity of the power source 220). For example, a controller 210 of an electronic component 205 may be configured to determine whether to perform (e.g., whether to initiate, whether to allow) operations of the corresponding circuitry 215 of the electronic component 205 that is associated with a power consumption from the power source 220, which may be based on monitoring for power arbitration indications of other electronic components 205 of the system 200.

In some examples, (e.g., where an electronic component 205 is an example of a memory device 130), a controller 210 may be an example of a local controller 135, or a portion thereof, and coupled circuitry 215 may include one or more memory arrays and circuitry configured for accessing the one or more memory arrays. For example, such a controller 210 may configured to cause the circuitry 215 to perform one or more memory access operations, which may be performed in response to an indication from another component of the system 200 (e.g., in response to an access command received at the electronic component 205, which may be from another electronic component 205), or may be determined internally to the electronic component 205 (e.g., a determination to perform a memory management operation, such as a wear-leveling operation, a garbage collection operations, an error control operation such as an error-detection or error-correction operation, an encryption operation, a caching operations, among other examples).

To manage (e.g., limit) peak power consumption from the power source 220, each electronic component 205 may be configured to contend for (e.g., request, reserve) a power allocation of the power source 220 before performing operations associated a power consumption from the power source 220. To support related indications among the electronic components 205, each electronic component 205 include a respective switching component 225 (e.g., a transistor) that is configured to modulate a conductivity between a conductor 250 (e.g., a signaling conductor, a signaling bus) and a respective voltage source 260 (e.g., voltage source 260-*a* of the electronic component 205-*a*, voltage source 260-*b* of the electronic component 205-*b*). The conductor 250 may be coupled with a voltage source 240 associated with a voltage that is different than (e.g., greater than) a voltage associated with the voltage sources 260. In some examples, the voltage sources 260 may be ground voltage sources, which may be coupled with a common ground node that is shared by components of the system 200.

For each electronic component 205, the respective controller 210 may be configured to operate (e.g., open, close) the respective switching component 225 based on an identifier of the electronic component 205 (e.g., an arbitration identifier). Such operating may include the respective controller 210 biasing a control node 230 of the respective switching component 225 (e.g., a gate of a transistor), which may control (e.g., permit, prevent) a flow of current through the respective switching component 225 (e.g., via a respective branch of the conductor 250, between the voltage source 240 and the respective voltage source 260). For each electronic component 205, the respective controller 210 may also be coupled with a respective node 235 (e.g., node 235-*a* or node 235-*b*), which may support monitoring a voltage of the conductor 250. In some examples, such monitoring may be performed during the switching of the respective switching component 225, which may support examples of power allocation arbitration described herein.

In some examples, the conductor 250 may be associated with a load portion 255, such as a load resistance, that supports the conductor 250 having a voltage that is near (e.g., equal to, approximately equal to) a voltage of a voltage source 260 if a corresponding switching component 225 is activated (e.g., forming a closed circuit, having a conductive channel). In other words, a voltage drop between a voltage source 240 and one or more voltage sources 260 due to current flow between such voltage sources may be concentrated in a load portion 255. Thus, by monitoring a respective node 235, a controller 210 of a given electronic component 205 may be able to monitor a voltage of the conductor 250 to evaluate whether another electronic component 205 is switching its respective switching component 225 in a different manner (e.g., based on whether a voltage of the conductor 250 aligns or does not align with expected values based on the switching of the switching component 225 of the given electronic component 205).

The respective identifier of each electronic component 205 may be associated with a set of one or more bits, among other identifiers that associate the electronic component 205 with a priority for power arbitration. For example, the electronic component 205-*a* may be associated with a first identifier and the electronic component 205-*b* may be associated with a second identifier that is associated with a lower priority than the first identifier. As such, if electronic components 205-*a* and 205-*b* concurrently indicate a request for an allocation of power (e.g., by switching their respective switching components 225 based at least in part on biasing the respective control nodes 230 in accordance with their respective identifiers), the electronic component 205-*a* may win an arbitration based on being associated with a higher-priority identifier. Based on winning the arbitration, the electronic component 205-*a* may proceed with operations of the circuitry 215-*a* associated with a consumption of power from the power source 220, whereas the electronic component 205-*b* may refrain from performing one or more power-consuming operations of the circuitry 215-*b*

In some implementations, based winning an arbitration, the controller 210-*a* may indicate a second identifier (e.g., a power token, via subsequent switching of the switching component 225-*a*) that supports reserving an allocation of power from the power source 220, which may be associated with a power consumption (e.g., an amount of power) associated with operations to be performed by the circuitry 215-*a*. The electronic component 205-*b* may be configured to monitor for such a second identifier (e.g., by the controller 210-*b* monitoring the node 235-*b* for a voltage associated with the second identifier, based on not winning the arbitration), which may support the electronic component 205-*b* tracking an amount of available power remaining after the electronic component 205-*a* wins the arbitration. In various implementations, the electronic component 205-*b* may continue to attempt arbitration after losing arbitration (e.g., until the electronic component 205-*b* wins arbitration and is able to perform at least a portion of operations of the circuitry 215-*b* determined by the controller 210-*b*, based on determining operations of the circuitry 215-*b* that may be performed with a remaining amount of power available from the power source 220).

In some examples, each controller 210 of the electronic components 205 may be coupled with a clock signal source 245, which may be common to the electronic components 205 of the system 200 and may be configured to output a clock signal. Each electronic component 205 attempting to contend for power from the power source 220 may switch the respective control node 230 in accordance with the clock signal of the clock signal source 245 (e.g., to synchronize power arbitration among the electronic components 205). Thus, in accordance with these and other examples, components of the system 200 may be configured to support dynamic power arbitration without a central controller for allocating power from the power source 220.

Figure 3:
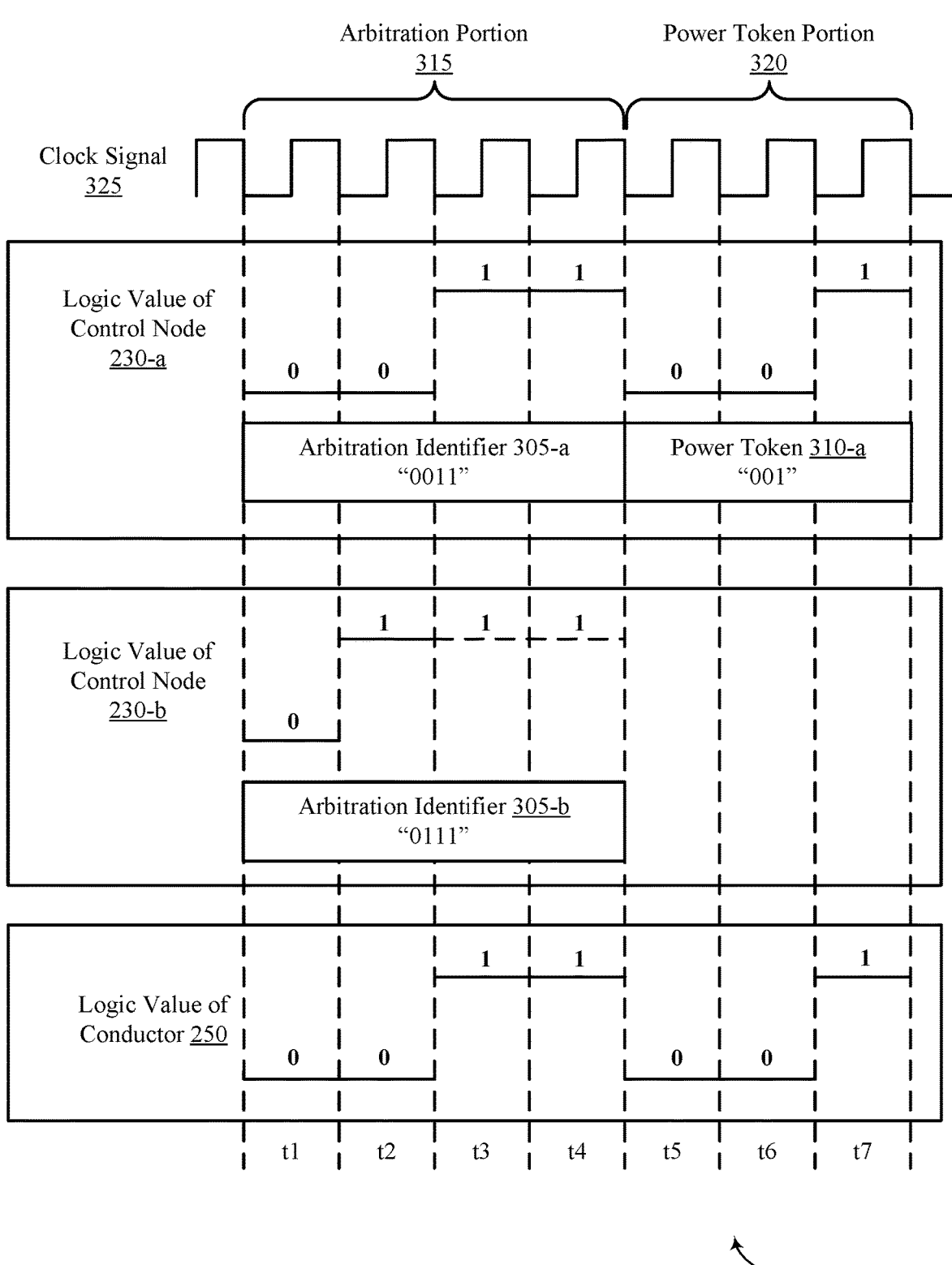
FIG. 3 illustrates an example of a signaling diagram that supports power arbitration for systems of electronic components in accordance with examples as disclosed herein.

FIG. 3 illustrates an example of a signaling diagram 300 that supports power arbitration for systems of electronic components in accordance with examples as disclosed herein. The signaling diagram 300 may implement one or more aspects of system 200. For example, the signaling diagram 300 may illustrate arbitration between the electronic components 205-*a* and 205-*b* to request power of the power source 220, where the arbitration and subsequent indication of a power reservation may occur during a set of clock cycles from the clock signal source 245. The signaling diagram 300 illustrates logic values at the control node 230-*a* and the control node 230-*b* and the resulting logic value of the conductor 250 during the set of clock cycles from the clock signal source 245.

The techniques illustrated by the signaling diagram 300 may be described in accordance with the switching components 225 operating as transistors in a pull-up circuit configuration, where voltage sources 260-*a* and 260-*b* may be ground voltage sources and the switching components 225-*a* and 225-*b* may be examples of NMOS transistors. However, in other implementations of the described techniques, switching components 225 may be examples of PMOS transistors, relays, or other types of switching components, which may involve different voltages of voltage sources 240 and 260, or different mappings (e.g., priorities) between voltages and logic values, among other differences.

In the implementation of the signaling diagram 300, if a controller 210 biases a respective control node 230 with a relatively high voltage (e.g., a positive voltage, an activation voltage, a logic 0 of a control node 230), the respective switching component 225 may form a closed circuit, such that the conductor 250 is coupled with a respective voltage source 260 (e.g., grounding the conductor 250, biasing nodes 235 with a voltage of one or more voltage sources 260), which may correspond to a logic value of 0 of the conductor 250 (e.g., of the nodes 235). If a controller 210 biases a respective control node 230 with a relatively low voltage (e.g., a ground voltage, a deactivation voltage, a logic 1 of a control node 230), the respective switching component 225 may form an open circuit, such that the conductor 250 is isolated from a respective voltage source 260. If none of the switching components 225 of the system 200 are activated, the conductor 250 may maintain a voltage of the voltage source 240, which may correspond to a logic value of 1 of the conductor 250 (e.g., of the nodes 235).

In some other examples, switching components 225 may be implemented as transistors in a pull-down circuit configuration. In such examples, if a controller 210 drives relatively low (e.g., negative, ground) voltage to a respective control node 230, then the switching component 225 may form a closed circuit, which may correspond to a logic value of 1 of the conductor 250. If the controller 210-*a* applies a relatively high (e.g., positive) voltage, then the switching component 225 may form an open circuit, which may correspond to a logic value of 0 of the conductor 250.

As described with reference to FIG. 2, the controller 210-*a* and 210-*b* may each be coupled with the clock signal source 245 to receive the clock signal 325. Additionally, each electronic component 205 may be configured with a respective arbitration identifier 305, which each may be a set of bits associated with an arbitration priority. For example, the electronic component 205-*a* may be associated with arbitration identifier 305-*a* (e.g., a logic value of 0011) and electronic component 205-*b* may be associated with arbitration identifier 305-*b* (e.g., a logic value of 0111). While the signaling diagram 300 illustrates an example of arbitration identifiers 305 including four bits, arbitration identifiers 305 may be implemented with any quantity of bits.

If one or more of the electronic components 205 determines to request power of the power source 220, the respective electronic components 205 may bias their respective control node 230 in accordance with their respective arbitration identifier 305. For instance, controller 210-*a* may bias the control node 230-*a* in accordance with arbitration identifier 305-*a* during an arbitration portion 315 of the clock signal 325. For example, during the first and second clock cycles of the arbitration portion 315 (e.g., during t1 and t2), the controller 210-*a* may apply a voltage to control node 230-*a* in accordance with applying a logic value of 0 to the control node 230-*a* and, for the third and fourth cycles of the arbitration portion 315 (e.g., during t3 and t4), the controller 210-*a* may apply a voltage to the control node 230-*a* in accordance with applying a logic value of 1 of the control node 230-*a*. In some examples, (e.g., during a concurrent power request), the controller 210-*b* may bias the control node 230-*b* in accordance with arbitration identifier 305-*b* during the arbitration portion 315. During the first clock cycle of the arbitration portion 315, the controller 210-*b* may apply a voltage to control node 230-*b* in accordance with applying a logic value of 0 of the control node 230-*b* and, for the second through fourth clock cycles of the arbitration portion 315, the controller 210-*b* may apply a voltage to the control node 230-*a* in accordance with applying a logic value of 1 of the control node 230-*a*.

To support each electronic component 205 monitoring for power requests of other electronic components 205 (e.g., higher-priority electronic components 205), each electronic component 205 may be configured to monitor the logic value of the conductor 250 (e.g., via a respective node 235). In the example of signaling diagram 300, based on the controller 210-*a* applying voltage corresponding to a logic 0 of the control node 230-*a* during the second cycle of the arbitration portion 315, the conductor 250 may be grounded, resulting in a logic value of 0 of the conductor 250. In such an example, the controller 210-*b* may monitor node 235-*b* and identify that the conductor 250 is at a logic value of 0, rather than the logic value of 1 associated with the second bit value of the arbitration identifier 305-*b*. Based on the logic value of the conductor 250 not matching the arbitration identifier 305-*b*, in some examples, the controller 210-*b* may stop performing arbitration for the remainder of the arbitration portion 315, which may involve refraining from biasing the control node 230-*b* during the third and fourth clock cycles of the arbitration portion 315. Thus, the electronic component 205-*b* may identify that it has lost arbitration, and may refrain from performing at least some of the operations of the circuitry 215-*b* or otherwise requesting power of the power source 220.

As illustrated in the signaling diagram 300, the logic values of the conductor 250 match the logic values of the arbitration identifier 305-*a* during the arbitration portion 315, which would be true if no other electronic components 205 were concurrently switching their respective switching components 225, or if electronic components 205 with lower-priority identifiers were concurrently switching their respective switching components 225. As such, the electronic component 205-*a* (e.g., the controller 210-*a*) may identify that it has won arbitration and may proceed with determined operations of the circuitry 215-*a*. In some examples, the electronic component 205-*a* may indicate an amount of power associated with such operations via a power token 310-*a* (e.g., having a logic value of 001). For example, the controller 210-*a* may bias the control node 230-*a* in accordance with the power token 310-*a* during a power token portion 320 of the clock signal 325. In some examples, the set of possible logic values of the power token 310-*a* may map to a set of values of electrical current, where a given logic value indicates an amount of current the controller 210-*a* may be requesting from the power source 220 (e.g., an amount of current to support the determined operations of the circuitry 315-*a*). In the example of signaling diagram 300, the power token 310-*a* has a length of three bits, resulting in 8 possible logic values that may map to 8 different current levels. Although signaling diagram 300 illustrates a power token 310 with a length of three bits, a power token may be implemented with any quantity of one or more bits, and an increase in bit length may correspond to an increase in granularity between the levels of current from the power source 220 that a given electronic component 205 may reserve.

During the power token portion 320, a respective controller 210 of each electronic component 205 (e.g., an electronic component 205 that did not win arbitration, an electronic component 205 that did not perform an arbitration during the arbitration portion 315) may monitor the conductor 250 to track a remaining amount of power available from the power source 220 (e.g., for subsequent operations or arbitrations). For example, controller 210-$b$ may monitor the value of the conductor 250 (e.g., via node 235-$b$) during the power token portion to identify the amount of power that the electronic component 205-$a$ is reserving from the power source 220. Based on such techniques, each electronic component 205 may update a cumulative amount of power being reserved from or otherwise being consumed from the power source 220, which may support determining an amount of remaining power from the power source 220 that is available for subsequent reservation. In some examples, a power token 310 may indicate a decrease in power consumption for the associated electronic component 205 (e.g., by an electronic component 205 that wins an arbitration, but indicates a negative power token 310, such as when one or more determined operations have been completed).

In some examples, a given electronic component 205 may determine that an amount of power involved with circuitry 215 performing operations may be greater than the amount of available power from the power source 220. In some such examples, the given electronic component 205 may refrain from performing arbitration for power until the amount of power available from the power source 220 is greater than or equal to amount of power involved with the operations, or the electronic component 205 may proceed with arbitration and, if the arbitration is won, may perform a subset of the determined operations.

A system of electronic components in accordance with the described techniques may include any quantity of electronic components 205, which may include various implementations of arbitration identifiers 305. Table 1 illustrates an example that may include thirteen electronic components 205, along with associated arbitration identifiers 305 and relative priorities:

TABLE 1

| Electronic component | Arbitration Identifier | Arbitration Priority |
| --- | --- | --- |
| ASIC | 0000 | 1 |
| NAND Die 0 | 0001 | 2 |
| NAND Die 1 | 0010 | 3 |
| NAND Die 2 | 0011 | 4 |
| NAND Die 3 | 0100 | 5 |
| NAND Die 4 | 0101 | 6 |
| NAND Die 5 | 0110 | 7 |
| NAND Die 6 | 0111 | 8 |
| NAND Die 7 | 1000 | 9 |
| . . . | . . . | . . . |
| NAND Die 11 | 1100 | 13 |

In the example of Table 1, a system of electronic components 205 may include an ASIC a set of NAND dies (e.g., coupled with the ASIC, operable to exchange data with the ASIC). In some cases, the arbitration identifier 305 associated with a given electronic component 205 may be based on the type of electronic component. For example, the ASIC may have the arbitration identifier 0000, which may correspond to a highest arbitration priority. As such, during power arbitration, the ASIC may have priority over all other electronic components 205 (e.g., equivalent to being directly coupled with the power source 220, without having to contend for power with the other electronic components 205). Although Table 1 illustrates an example of an ASIC and a set of NAND dies, the described techniques may implement other types of electronic components 205, including components of a memory system (e.g., asynchronous NAND memory dies or FeRAM), among other systems.

A set of electronic components 205 may be configured with their respective arbitration identifiers 305 in various ways. For example, each electronic component 205 may be configured (e.g., preconfigured) with respective arbitration identifier 305 during manufacturing (e.g., during fabrication, during assembly, during a post-assembly configuration). Additionally, or alternatively, each electronic component 205 may receive signaling indicating their respective arbitration identifier 305 or a change in their respective arbitration identifier 305. For instance, a first electronic component 205 or some other component of the system 200 (e.g., an ASIC, a memory system controller 115, a host system controller 106) may transmit signaling to at least some of the electronic components 205, which may indicate a change to arbitration identifiers 305, or may indicate which arbitration identifier 305 to use, among other examples.

FIG. 4 illustrates a flowchart showing a method 400 that supports power arbitration for systems of electronic components in accordance with examples as disclosed herein. The operations of method 400 may be implemented by an electronic component or its components as described herein. For example, the operations of method 400 may be performed by an electronic component as described with reference to FIGS. 1 through 3 (e.g., a controller 210). In some examples, an electronic component may execute a set of instructions to control the functional elements of the device to perform the described functions. Additionally, or alternatively, the electronic component may perform aspects of the described functions using special-purpose hardware.

At 405, the method may include determining, at an electronic component coupled with a power source and a signaling conductor, an operation of the electronic component associated with a power consumption from the power source.

At 410, the method may include switching a transistor coupled with the signaling conductor in accordance with an identifier associated with the electronic component.

At 415, the method may include determining whether to perform the operation based at least in part on monitoring a signal level of the signaling conductor during the switching.

In some examples, an apparatus as described herein may perform a method or methods, such as the method 400. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for: determining, at an electronic component coupled with a power source and a signaling conductor, an operation of the electronic component associated with a power consumption from the power source; switching a transistor coupled with the signaling conductor in accordance with an identifier associated with the electronic component; and determining whether to perform the operation based at least in part on monitoring a signal level of the signaling conductor during the switching.

Aspect 2: The method, apparatus, or non-transitory computer-readable medium of aspect 1, further including operations, features, circuitry, logic, means, or instructions, or any combination thereof for: determining, based at least in part on the signal level of the signaling conductor during the switching, that a second electronic component coupled with the power source is not requesting power from the power source; and performing the operation based at least in part on determining that the second electronic component is not requesting power from the power source.

Aspect 3: The method, apparatus, or non-transitory computer-readable medium of aspect 2, further including operations, features, circuitry, logic, means, or instructions, or any combination thereof for switching the transistor, before performing the operation, in accordance with a second identifier associated with the power consumption from the power source.

Aspect 4: The method, apparatus, or non-transitory computer-readable medium of any of aspects 1 through 3, further including operations, features, circuitry, logic, means, or instructions, or any combination thereof for: determining, based at least in part on the signal level of the signaling conductor during the switching, that a second electronic component coupled with the power source is requesting power from the power source; and refraining from performing the operation based at least in part on determining that the second electronic component is requesting power from the power source.

Aspect 5: The method, apparatus, or non-transitory computer-readable medium of aspect 4, further including operations, features, circuitry, logic, means, or instructions, or any combination thereof for: determining an amount of available power from the power source based at least in part on a second signal level of the signaling conductor after the switching.

Aspect 6: The method, apparatus, or non-transitory computer-readable medium of any of aspects 1 through 5, further including operations, features, circuitry, logic, means, or instructions, or any combination thereof for: receiving a clock signal; and switching the switching component in accordance with a set of bits of the identifier based at least in part on one or more transitions of the clock signal.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 7: An apparatus, including: circuitry configured to couple with a power source; a switching component configured to couple with a signaling conductor; and a controller coupled with the circuitry and the switching component, and configured to cause the apparatus to: determine an operation of the circuitry that is associated with a power consumption from the power source; switch the switching component, based at least in part on determining the operation of the circuitry, in accordance with an identifier associated with the apparatus; and determine whether to perform the operation of the circuitry based at least in part on monitoring a signal level of the signaling conductor during the switching.

Aspect 8: The apparatus of aspect 7, where the controller is further configured to cause the apparatus to: receive a clock signal; and switch the switching component in accordance with a set of one or more bits of the identifier based at least in part on one or more transitions of the clock signal.

Aspect 9: The apparatus of any of aspects 7 through 8, where: the circuitry includes an array of memory cells and access circuitry operable to access the array of memory cells; and the operation of the circuitry includes an operation of the access circuitry to access the array of memory cells.

Aspect 10: The apparatus of any of aspects 7 through 9, where the controller is further configured to cause the apparatus to: determine, based at least in part on the signal level of the signaling conductor during the switching, that a second apparatus coupled with the power source is not requesting power from the power source; and perform the operation based at least in part on determining that the second apparatus is not requesting power from the power source.

Aspect 11: The apparatus of aspect 10, where the second apparatus is associated with a second identifier having a higher priority than the identifier associated with the apparatus.

Aspect 12: The apparatus of any of aspects 10 through 11, where the controller is further configured to cause the apparatus to: switch the switching component, before performing the operation, in accordance with a second identifier associated with the power consumption from the power source.

Aspect 13: The apparatus of any of aspects 7 through 12, where the controller is further configured to cause the apparatus to: determine, based at least in part on the signal level of the signaling conductor during the switching, that a second apparatus coupled with the power source is requesting power from the power source; and refrain from performing the operation based at least in part on determining that the second apparatus is requesting power from the power source.

Aspect 14: The apparatus of aspect 13, where the second apparatus is associated with a second identifier having a higher priority than the identifier associated with the apparatus.

Aspect 15: The apparatus of any of aspects 13 through 14, where the controller is configured to cause the apparatus to: determine an amount of available power from the power source based at least in part on a second signal level of the signaling conductor after the switching.

Aspect 16: The apparatus of any of aspects 7 through 15, where the controller is further configured to cause the apparatus to: identify that an amount of available power from the power source is greater than the power consumption from the power source; and switch the switching component in accordance with the identifier based at least in part on identifying that the amount of available power from the power source is greater than the power consumption from the power source.

Aspect 17: The apparatus of any of aspects 7 through 16, where the controller is further configured to cause the apparatus to: receive an indication to update from the identifier to a second identifier associated with the apparatus, the second identifier having a different priority then the identifier.

Aspect 18: The apparatus of any of aspects 7 through 17, where the switching component includes a transistor having a channel coupled between the signaling conductor and a voltage source and, to switch the switching component, the controller is configured to cause the apparatus to: bias a gate of the transistor to modulate a conductivity of the channel.

Aspect 19: A system comprising: a power source; a signaling conductor coupled with a voltage source; and a plurality of electronic components each comprising respective circuitry coupled with the power source and a respective switching component coupled with the signaling conductor, each of the plurality of electronic components configured to: determine an operation of the respective circuitry of the electronic component that is associated with a power consumption from the power source; switch the respective switching component, based at least in part on determining the operation of the respective circuitry of the electronic component, in accordance with an identifier associated with the electronic component; and determine whether to perform the operation based at least in part on monitoring a signal level of the signaling conductor during the switching.

Aspect 20: The system of aspect 19, further comprising: a clock signal source configured to output a clock signal, wherein each of the plurality of electronic components is further configured to: receive the clock signal; and switch the respective switching component in accordance with a set of bits of the identifier associated with the electronic component based at least in part on one or more transitions of the clock signal.

Aspect 21: The system of any of aspects 19 through 20, wherein each of the plurality of electronic components is further configured to determine to perform the operation based at least in part on the signal level of the signaling conductor during the switching indicating that another electronic component of the plurality of electronic components, having a higher priority than the electronic component, is not requesting power from the power source; and perform the operation based at least in part on determining to perform the operation.

Aspect 22: The system of aspect 21, wherein each of the plurality of electronic components is further configured to switch the respective switching component, based at least in part on determining to perform the operation, in accordance with a second identifier associated with the power consumption.

Aspect 23: The system of any of aspects 19 through 22, wherein each of the plurality of electronic components is further configured to determine to refrain from performing the operation based at least in part on the signal level of the signaling conductor during the switching indicating that another electronic component of the plurality of electronic components, having a higher priority than the electronic component, is requesting power from the power source; and refrain from performing the operation based at least in part on determining to refrain from performing the operation.

Aspect 24: The system of aspect 23, wherein each of the plurality of electronic components is further configured to determine an amount of available power from the power source based at least in part on a second signal level of the signaling conductor after the switching.

Aspect 25: The system of any of aspects 19 through 24, wherein a first electronic component of the plurality of electronic components comprises a first memory device; a second electronic component of the plurality of electronic components comprises a second memory device; and a third electronic component of the plurality of electronic components comprises an integrated circuit operable to access the first memory device and the second memory device.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and second condition or action may occur directly as a result of the previous condition or action occurring independent of whether other conditions or actions occur. In some examples, a first condition or action may be performed, and second condition or action may occur directly as a result of the previous condition or action occurring, such that no other intermediate conditions or actions occur between the earlier condition or action and the second condition or action, or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
circuitry configured to couple with a power source;
a switching component configured to couple with a signaling conductor; and
a controller coupled with the circuitry and the switching component, and configured to cause the apparatus to:
determine an operation of the circuitry that is associated with a power consumption from the power source;
switch the switching component, based at least in part on determining the operation of the circuitry, in accordance with an identifier associated with the apparatus; and
determine whether to perform the operation of the circuitry based at least in part on monitoring a signal level of the signaling conductor during the switching.

2. The apparatus of claim 1, wherein the controller is further configured to cause the apparatus to:
receive a clock signal; and
switch the switching component in accordance with a set of one or more bits of the identifier based at least in part on one or more transitions of the clock signal.

3. The apparatus of claim 1, wherein:
the circuitry comprises an array of memory cells and access circuitry operable to access the array of memory cells; and
the operation of the circuitry comprises an operation of the access circuitry to access the array of memory cells.

4. The apparatus of claim 1, wherein the controller is further configured to cause the apparatus to:
determine, based at least in part on the signal level of the signaling conductor during the switching, that a second apparatus coupled with the power source is not requesting power from the power source; and
perform the operation based at least in part on determining that the second apparatus is not requesting power from the power source.

5. The apparatus of claim 4, wherein the second apparatus is associated with a second identifier having a higher priority than the identifier associated with the apparatus.

6. The apparatus of claim 4, wherein the controller is further configured to cause the apparatus to:
switch the switching component, before performing the operation, in accordance with a second identifier associated with the power consumption from the power source.

7. The apparatus of claim 1, wherein the controller is further configured to cause the apparatus to:
determine, based at least in part on the signal level of the signaling conductor during the switching, that a second apparatus coupled with the power source is requesting power from the power source; and refrain from performing the operation based at least in part on determining that the second apparatus is requesting power from the power source.

8. The apparatus of claim 7, wherein the second apparatus is associated with a second identifier having a higher priority than the identifier associated with the apparatus.

9. The apparatus of claim 7, wherein the controller is configured to cause the apparatus to:
determine an amount of available power from the power source based at least in part on a second signal level of the signaling conductor after the switching.

10. The apparatus of claim 1, wherein the controller is further configured to cause the apparatus to:
identify that an amount of available power from the power source is greater than the power consumption from the power source; and
switch the switching component in accordance with the identifier based at least in part on identifying that the amount of available power from the power source is greater than the power consumption from the power source.

11. The apparatus of claim 1, wherein the controller is further configured to cause the apparatus to:
receive an indication to update from the identifier to a second identifier associated with the apparatus, the second identifier having a different priority then the identifier.

12. The apparatus of claim 1, wherein the switching component comprises a transistor having a channel coupled between the signaling conductor and a voltage source and, to switch the switching component, the controller is configured to cause the apparatus to:
bias a gate of the transistor to modulate a conductivity of the channel.

13. A system comprising:
a power source;
a signaling conductor coupled with a voltage source; and
a plurality of electronic components each comprising respective circuitry coupled with the power source and a respective switching component coupled with the signaling conductor, each of the plurality of electronic components configured to:
determine an operation of the respective circuitry of the electronic component that is associated with a power consumption from the power source;
switch the respective switching component, based at least in part on determining the operation of the respective circuitry of the electronic component, in accordance with an identifier associated with the electronic component; and
determine whether to perform the operation based at least in part on monitoring a signal level of the signaling conductor during the switching.

14. The system of claim 13, further comprising:
a clock signal source configured to output a clock signal, wherein each of the plurality of electronic components is further configured to:
receive the clock signal; and
switch the respective switching component in accordance with a set of bits of the identifier associated with the electronic component based at least in part on one or more transitions of the clock signal.

15. The system of claim 13, wherein each of the plurality of electronic components is further configured to:
determine to perform the operation based at least in part on the signal level of the signaling conductor during the switching indicating that another electronic component of the plurality of electronic components, having a higher priority than the electronic component, is not requesting power from the power source; and perform the operation based at least in part on determining to perform the operation.

16. The system of claim 15, wherein each of the plurality of electronic components is further configured to switch the respective switching component, based at least in part on determining to perform the operation, in accordance with a second identifier associated with the power consumption.

17. The system of claim 13, wherein each of the plurality of electronic components is further configured to:

determine to refrain from performing the operation based at least in part on the signal level of the signaling conductor during the switching indicating that another electronic component of the plurality of electronic components, having a higher priority than the electronic component, is requesting power from the power source; and refrain from performing the operation based at least in part on determining to refrain from performing the operation.

18. The system of claim 17, wherein each of the plurality of electronic components is further configured to determine an amount of available power from the power source based at least in part on a second signal level of the signaling conductor after the switching.

19. The system of claim 13, wherein:

a first electronic component of the plurality of electronic components comprises a first memory device;

a second electronic component of the plurality of electronic components comprises a second memory device; and a third electronic component of the plurality of electronic components comprises an integrated circuit operable to access the first memory device and the second memory device.

20. A non-transitory computer-readable medium storing code, the code comprising instructions executable by a processor to:

determine, at an electronic component coupled with a power source and a signaling conductor, an operation of the electronic component associated with a power consumption from the power source;

switch a transistor coupled with the signaling conductor in accordance with an identifier associated with the electronic component; and determine whether to perform the operation based at least in part on monitoring a signal level of the signaling conductor during the switching.

* * * * *